United States Patent [19]

Warwick

[11] 4,428,461
[45] Jan. 31, 1984

[54] DISC BRAKE CALIPER ASSEMBLY
[75] Inventor: Edward H. Warwick, Englewood, Ohio
[73] Assignee: General Motors Corporation, Detroit, Mich.
[21] Appl. No.: 353,530
[22] Filed: Mar. 1, 1982
[51] Int. Cl.³ .......................................... F16D 55/224
[52] U.S. Cl. ................................ 788/72.4; 188/73.31; 188/73.45; 188/370
[58] Field of Search .................. 188/72.4, 72.5, 73.31, 188/73.32, 73.43, 73.44, 73.45, 368, 369, 370; 188/205

[56] References Cited
U.S. PATENT DOCUMENTS

| 2,531,341 | 11/1950 | Meador, Jr. | 188/72.4 |
| 2,799,367 | 7/1957 | Dotto | 188/73.31 |
| 2,856,034 | 10/1958 | Mossey | 188/73.31 |
| 3,265,167 | 8/1966 | Yazell, Jr. | 188/251 M |
| 3,705,641 | 12/1972 | Brooks et al. | 188/73.31 |
| 3,999,635 | 12/1976 | Hotchkiss | 188/72.5 |

FOREIGN PATENT DOCUMENTS

| 1625809 | 1/1970 | Fed. Rep. of Germany . |
| 2129559 | 10/1972 | France . |
| 1373622 | 11/1974 | United Kingdom . |
| 2049846 | 12/1980 | United Kingdom . |

Primary Examiner—Douglas C. Butler
Attorney, Agent, or Firm—D. D. McGraw

[57] ABSTRACT

The outboard brake lining is attached directly to the housing rather than to a brake shoe. The inboard line is received in the housing bore and brake fluid acts against a cap for a piston made of lining material, eliminating the conventional piston and inboard shoe. The cylinder is attached by integrally formed screw threads to the cast caliper body.

1 Claim, 3 Drawing Figures

DISC BRAKE CALIPER ASSEMBLY

The invention relates to a disc brake which is lighter in weight than similar capacity brakes currently on the automotive market. The arrangement also provides for additional usable brake lining compared to brake shoe assembly arrangements commonly used. The caliper housing has a light weight cylinder which is attached to one of the caliper legs by screw threads. The cylinder may be extruded, forged or diecast. In more particular detail, the outboard brake lining is removably mounted directly on to the outboard caliper leg, eliminating a brake shoe backing plate. This permits thicker lining material in the same space, and reduces the weight since the metallic backing plate normally used weighs more than the lining material and clip used in practicing the invention. The inboard lining material is formed to provide a piston so that the lining material itself becomes the disc brake piston. When the lining material is of a type that may be adversely affected by hydraulic brake fluid, a suitable piston cap is provided to insure separation of the hydraulic brake fluid and the piston. If the lining material is capable of co-existence with the hydraulic brake fluid used without any adverse effect on the lining material, the piston cap may be omitted.

IN THE DRAWINGS

Figure 1:
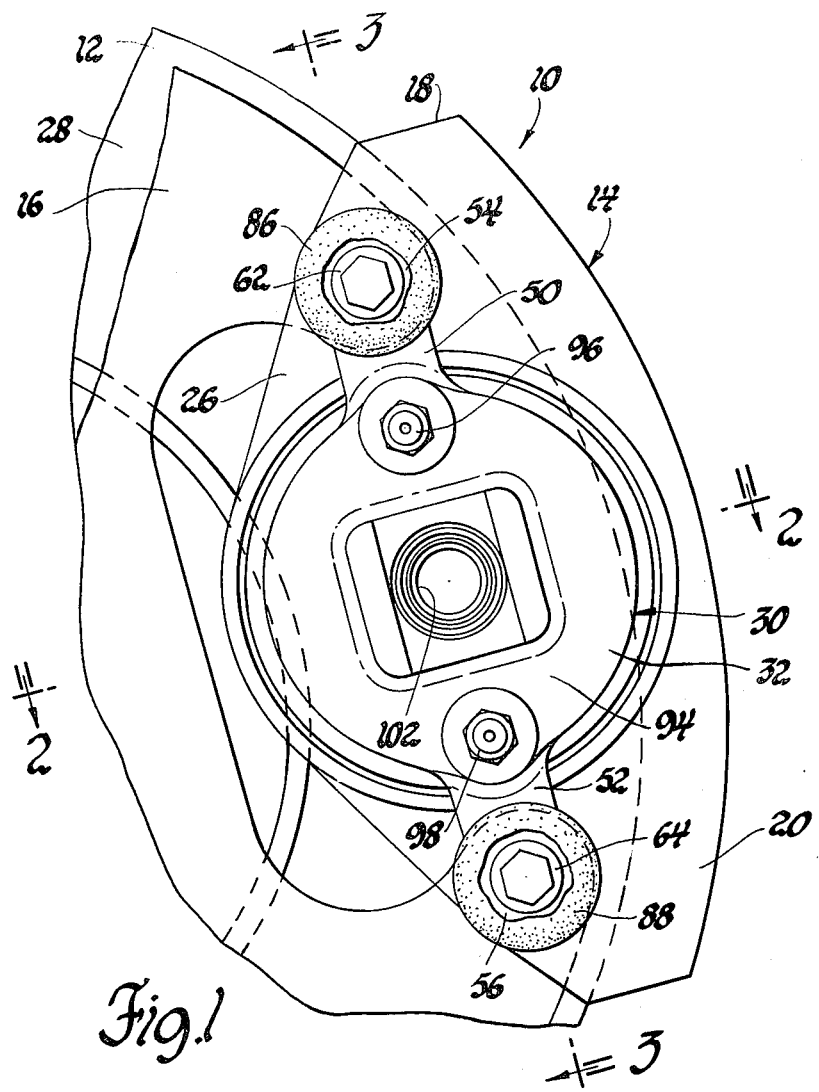
FIG. 1 is an elevation view of a disc brake assembly embodying the invention, parts being broken away.
Figure 2:
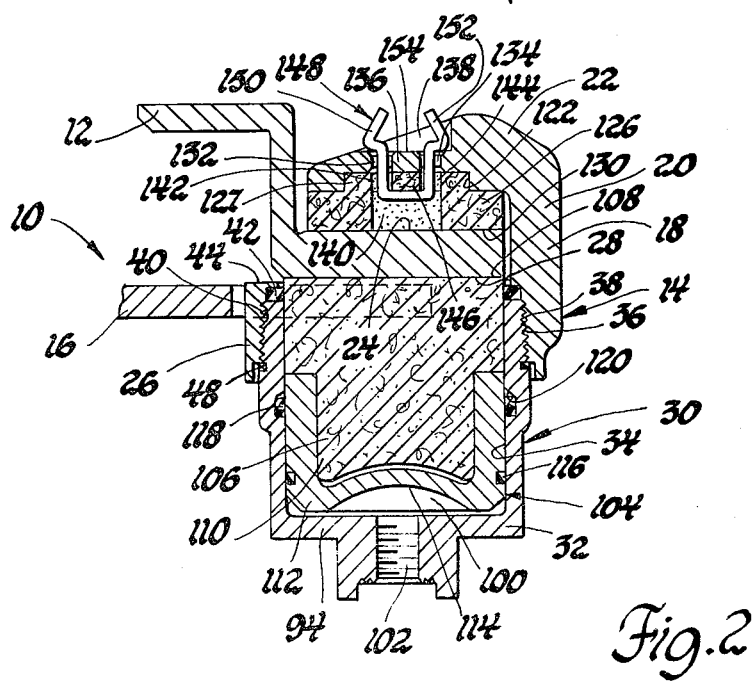
FIG. 2 is a cross section view of the brake assembly of FIG. 1 taken in the direction of arrows 2—2 of FIG. 1.
Figure 3:
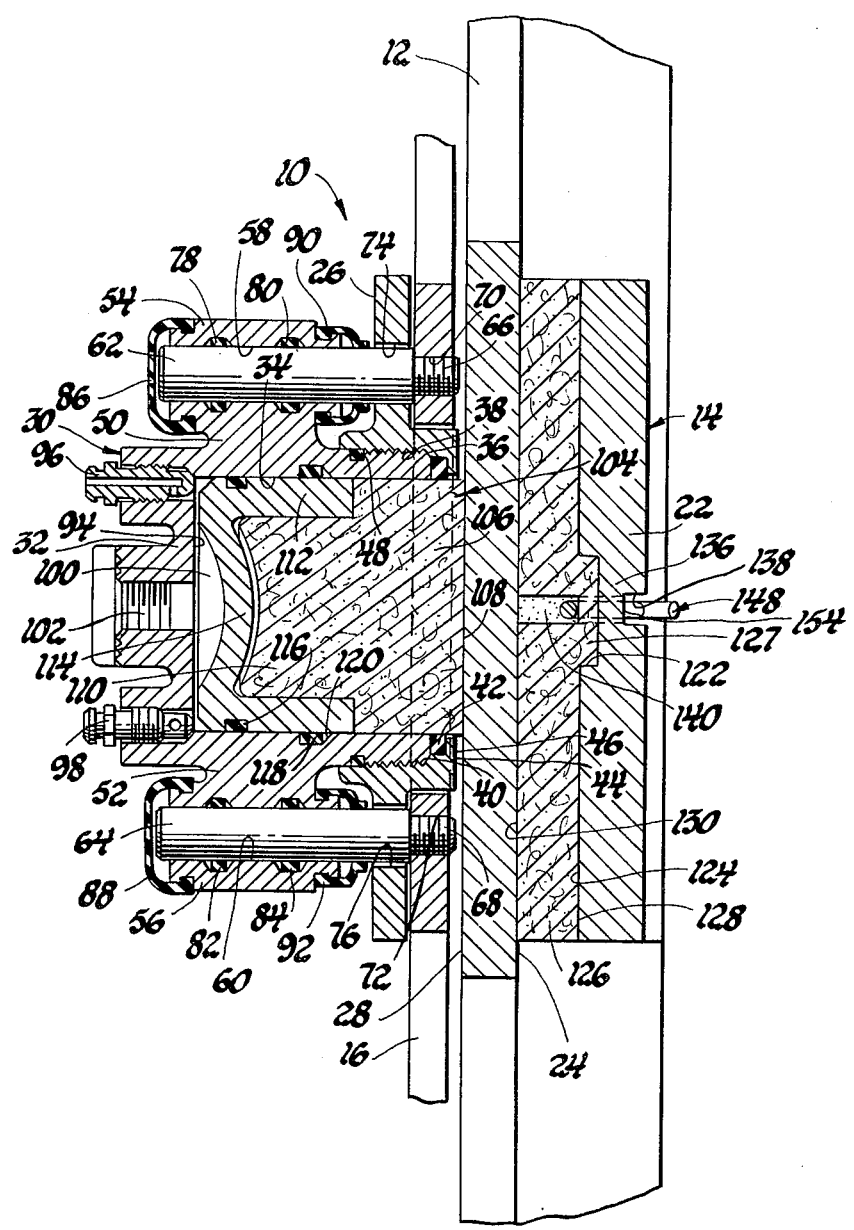
FIG. 3 is a cross section view, with parts broken away, of the disc brake assembly of FIG. 1 taken in the direction of arrows 3—3 of FIG. 1.

The disc brake assembly 10 is illustrated as being generally of a type in current production on automotive vehicles, with modifications embodying the invention. The assembly 10 includes a rotatable disc 12 to be braked, a caliper assembly 14, and a mounting bracket 16 on which the caliper assembly is slidably mounted. Braking torque is transmitted from the caliper assembly through the mounting bracket to a fixed portion of the vehicle.

The caliper assembly 14 includes a caliper 18 generally formed to provide a bridge section 20 extending over the outer periphery of an arcuate portion of disc 12, an outboard caliper leg 22 extending along the outboard disc surface 24 in spaced relation thereto, and an inboard caliper leg 26 extending along the inboard disc surface 28 in spaced relation thereto. A hydraulic actuating cylinder assembly 30 includes arrangements for slidably mounting the caliper assembly 14 on the mounting bracket 16. Assembly 30 includes a housing 32 having a cylinder 34 formed therein. The outboard end of housing 32 has external threads 36 formed thereon and threaded into mating internal threads 38 formed in an opening 40 in the inboard caliper leg 26. A seal 42 is provided between the end surface 44 of cylinder housing 32 and a lip 46 formed as a part of caliper leg 26 at the outboard edge of opening 40. Seal 42 operates as a dust seal. Another seal 48 is provided near the inboard side of opening 40 to protect the threads 36 and 38. Seal 48 may also act as a locking seal.

Housing 32 has mounting arms 50 and 52 extending therefrom in diametrically opposite directions and generally parallel to disc 12 and mounting bracket 16. The outer ends of these arms are formed as bosses 54 and 56 through which bores 58 and 60 are respectively formed. These bores are axially parallel to the axis of rotation of disc 12. Mounting pins 62 and 64 are respectively received through bores 58 and 60. The outboard ends 66 and 68 of the pins are threaded into threaded openings 70 and 72 formed through mounting bracket 16. The pins also freely extend through openings 74 and 76 formed in the inboard caliper leg 26 so that the caliper leg does not contact the pins. Suitable retracting and adjusting seals 78 and 80 are located in bore 58 and similar seals 82 and 84 are located in bore 60. The grooves in which these seals are located permit adjusting and retracting action on the pins 62 and 64, as is known in the art. Outer boots 86 and 88 and inner boots 90 and 92 are fitted over the ends of bores 58 and 60 and protect the sliding surfaces of the pins and bores against contamination.

The inboard end of cylinder 34 is closed by end wall 94. Bleeder valves 96 and 98 are fitted at suitable locations in the end wall so that one of the bleeder valves is positioned at the top of the pressure chamber 100, located in cylinder 34 adjacent end wall 94, when the brake is installed on a vehicle. An inlet 102 is formed through end wall 94 and provides a suitable connection for delivery of hydraulic brake fluid to the chamber 100 when the brake is actuated.

The piston assembly 104 is reciprocably received in cylinder 34. In the particular construction illustrated, piston assembly 104 includes a piston 106 made of brake lining material and extending outwardly through the open end of cylinder 34 so that its friction braking surface 108 is engageable with disc surface 28 when the brake is actuated. Seal 42 may lightly engage the outboard portion of piston 106 to prevent dust from entering cylinder 34. The inboard end 110 of piston 106 is slightly reduced in diameter so as to receive a piston cap 112. The cap has an end 114 which forms one wall of chamber 100. Cap 112 is also provided with a seal 116 which seals against the side wall of cylinder 34. The cap extends outwardly sufficiently far to be engaged by retracting and adjusting seal 118. A suitable groove 120 receives seal 118. Groove 120 is formed in the wall of cylinder 34 and shaped to permit adjusting and retracting action of seal 118, as is well known in the art.

The hydraulic brake fluid in predominant use on automotive vehicles at this time is not compatible with brake lining materials having organic components. It is therefore desirable to use piston cap 112. However, it is within the scope of the invention to use lining material and hydraulic brake fluid which are compatible so that piston cap 112 is omitted and the entire piston assembly 104, except for the seals, is made of lining material. This may be accomplished, for example, by the use of certain metallic, semi-metallic or ceramic friction braking materials, and/or the use of other types of hydraulic brake fluid. By way of example, a silicone based fluid may be compatible with some lining materials.

The outboard caliper leg 22 is provided with a recess 122 on the side thereof facing disc surface 24, and the leg surface 124 into which recess 122 is formed is shaped to receive the outboard brake lining 126 in substantially fully surface engagement with the outer surface 128 of the lining 126. Lining 126 has a button or boss 127 which fits into recess 122. No backing plate or brake shoe is provided, the outboard lining 126 being mounted directly on the caliper leg 22 so that the lining friction braking surface 130 is in position for braking engagement with disc surface 24. Spaced holes 132 and 134 are formed through the bottom wall 136 of recess 122 and open into an outwardly extending recess 138 formed in the caliper leg 22. Brake lining 126 has a recess 140 formed through its friction braking surface 130 in alignment with boss 127 so that holes 142 and 144 formed in the bottom wall 146 of recess 140 and through boss 127 are in alignment with holes 132 and 134. A generally U-shaped clip 148 is inserted through the recess 140 and the aligned holes 142, 132 and 144, 134. The clip legs 150 and 152 are bent to engage the bottom surface 154 of recess 138 to hold lining 126 in position while permitting removal and replacement of the lining as necessary.

The construction herein disclosed and claimed provides a light weight disc brake caliper assembly by eliminating inboard and outboard brake shoe assembly backing plates, and by providing a light weight cylinder housing which can be made of a light metal such as aluminum while making the caliper bridge and legs of a much stronger material. It also results in having additional lining material available without increasing caliper exterior dimensions, increasing the time between lining replacements.

The embodiments of the invention in which an exclusive property or privilege is claimed are defined as follows:

1. In a disc brake assembly having a rotatable disc to be braked and a slidable caliper assembly actuatable to brake the disc, the improvement comprising:

a caliper housing formed to provide first and second legs positioned on opposed friction braking surface sides of said disc and a bridge section extending peripherally across said disc and joining said legs, said first leg having an internally threaded aperture positioned on an axis parallel to the axis of rotation of said disc;

a hydraulic cylinder having a recess formed therein defining a hydraulic pressure chamber, an externally threaded open end threaded into said internally threaded aperture to secure said cylinder to said caliper housing, and caliper mounting arms on said cylinder extending outwardly and radially and providing slidable mounting means for slidably mounting and guiding said slidable caliper assembly in directions parallel to the axis of rotation of said disc;

first brake friction material forming brake lining secured directly onto said second leg for braking engagement with one friction braking surface side of said disc;

and second brake friction material forming a piston slidably mounted in said caliper recess and reciprocably movable therein and responsive to hydraulic brake actuating pressure in said hydraulic pressure chamber to engage the other friction braking surface side of said disc when the brake assembly is actuated.

* * * * *